United States Patent [19]

Sakata

[11] 4,047,469
[45] Sept. 13, 1977

[54] METHOD FOR SUPPRESSING CHATTER VIBRATIONS IN A MACHINE TOOL

[75] Inventor: Okitsugu Sakata, Tokyo, Japan

[73] Assignee: Agency of Industrial Science & Technology, Tokyo, Japan

[21] Appl. No.: 629,066

[22] Filed: Nov. 5, 1975

[30] Foreign Application Priority Data

Nov. 5, 1974   Japan .................................. 49-126682

[51] Int. Cl.$^2$ ............................................ B23Q 11/00
[52] U.S. Cl. .................................... 90/11 C; 82/1 C;
82/DIG. 9; 90/11 R; 408/143
[58] Field of Search .................. 90/11 R, 11 A, 11 C;
82/1 C, 38 A, DIG. 9; 408/143, 1; 51/168

[56] References Cited

U.S. PATENT DOCUMENTS

| | | | |
|---|---|---|---|
| 1,292,494 | 1/1919 | Lorenz | 82/1 C |
| 3,207,014 | 9/1965 | Carlstedt | 82/DIG. 9 |
| 3,744,353 | 7/1973 | Rohs | 82/DIG. 9 |

FOREIGN PATENT DOCUMENTS 991,336   5/1965   United Kingdom ............ 82/DIG. 9

*Primary Examiner*—Othell M. Simpson
*Assistant Examiner*—Z. R. Bilinsky
*Attorney, Agent, or Firm*—Kurt Kelman

[57] ABSTRACT

Disclosed is a method for suppressing the self-excited chatter vibrations in a machine tool of the type having a "non-rotating" tool or of the type having a "rotating" tool. According to this invention a chatter suppressing contact is provided to itself the tool of the non-rotating type machine tool or to the rotating spindle to which the tool is fixed in the rotating type machine tool in such a way that the chatter suppressing contact slidably reciprocates on the tool or the rotating spindle thus changing the contact point with time. As a result the natural frequency of the tool is changed while it is employed in machining, and the self-excited chatter vibration are suppressed. The chatter suppressor contact which is used in a non-rotating type machine tool is in the form of an auxiliary tool holder, whereas the chatter suppressor contact which is used in a rotating type machine tool is in the form of a ball or roller bearing.

6 Claims, 11 Drawing Figures

METHOD FOR SUPPRESSING CHATTER VIBRATIONS IN A MACHINE TOOL

BACKGROUND OF THE INVENTION

This invention relates to a method for suppressing chatter vibrations, particularly self-excited chatter vibrations caused in a machine tool when in operation.

These are two different kinds of chatter vibration; one is called "forced chatter vibration" and the other "self-excited chatter vibration". Forced chatter vibration is caused for instance by a motor when working or by a train of gears when rotating and engaging with each other, and is transmitted from such vibration sources to the surface of a workpiece which is being machined. This sort of vibration is not caused by the cutting zone. In contrast to this, the self-excited chatter vibration is caused in the cutting zone. More specifically, for instance a bit used in cutting or peeling a workpiece is not stable. This is due to the uneven surface of the workpiece, intervenient fractures of metal swarf and other factors. The surface of the workpiece thus machined becomes sinusoidal. This sinusoidal wave on the surface of the workpiece causes the chatter vibration of the tool when machining the workpiece for the second time. Thus, on the surface of the workpiece there will subsequently appear a different sinusoidal pattern each time a single machining has been performed. The last sinusoidal pattern is different from the preceding one in phase by a certain amount. It has been found that the maximum energy to produce the self-excited chatter vibration is stored when there is a definite phase difference between each sinusoidal pattern and the one preceding it. In this connection the self-excited chatter vibration will be suppressed by changing the phase difference in successive sinusoidal patterns.

As a method for suppressing the self-excited chatter vibration it has been hitherto proposed that the rotation speed of the workpiece be changed during is machining so as to alter the phase pitch between successive patterns. This is effective in suppressing the self-excited vibration. If the rotation speed of the workpiece is changed in the course of machining, however the bending displacement of the tool and the machinability of the workpiece will accordingly vary with the result that the working accuracy is lowered.

The object of this invention is to provide a method for suppressing the self-excited chatter vibration without recourse to changing the rotation speed of either the workpiece or the tool in machining.

SUMMARY OF THE INVENTION

To attain the above object, the method for suppressing the self-excited chatter vibration according to this invention comprises the steps of: contacting a chatter suppressing inert mass with the tool of a machine tool of the non-rotating type or with the tool spindle in a machine tool of the rotating type; and continuously sliding and reciprocating the chatter suppressing mass on the tool or on the tool spindle to shift the contact pressure, thus changing the natural frequency of the tool system during the machining operation. The chatter suppressing mass which is used in a non-rotating machine tool comprises a revolving body (ball or roller) and an associated retainer, whereas the chatter suppressing mass which is used in a rotating machine tool is in the form of ball or roller bearing or flywheel. In case where the self-excited chatter vibration is at a frequency close to the natural frequency of the tool system, the chatter suppressing mass is shifted on the tool or tool spindle until the vibration stops, and then the contact is made to slide back and forth the same distance on either side of the so-determined balancing position.

On the contrary, in case where the self-excited chatter vibration is at a frequency close to the natural frequency of the workpiece being machined, the chatter suppressing contact is shifted on the tool or tool spindle until the natural frequency of the tool system matches that of the workpiece system, and then the contacting mass is made to slide back and forth the same distance on either side of the so-determined balancing position. In either case the natural frequency of the tool varies in working with the result that the self-excited chatter vibration is completely suppressed, thus permitting the workpiece to be machined with high precision.

Other objects and advantages of this invention will be better understood from the following description of some preferred embodiments.

DETAILED EXPLANATION OF THE INVENTION

Figure 1:
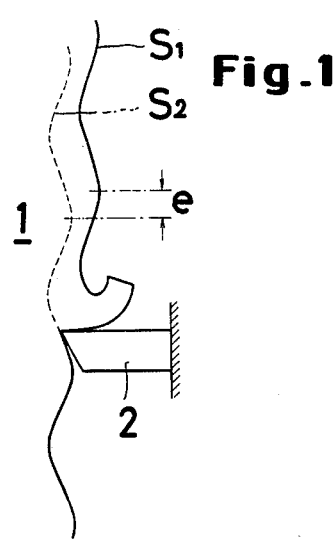
FIG. 1 is a sectional view showing how the self-excited chatter vibration is caused.
Figure 2:
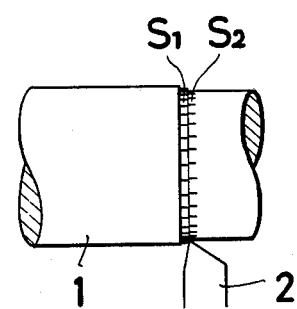
FIG. 2 shows an sinusoidal surface pattern appearing on the workpiece as a result of the self-excited chatter vibration.

Referring to FIG. 1, there is shown the manner in which the self-excited chatter vibration is caused. When a non-rotating tool 2 machines a workpiece 1 for the first time, a first sinusoidal wave having a constant pitch appears on the cylindrical surface "$S_1$" of the workpiece 1. When the tool 2 machines the workpiece 1 for the second time, a second sinusoidal wave having the same constant pitch as the first sinusoidal wave but shifted in phase by $e$ with respect to the first sinusoidal wave, will result on the surface "$S_2$" of the workpiece. Thus, on the cylindrical surface of the workpiece there will appear an sinusoidal pattern which is composed of a plurality of sinusoidal waves sequentially phase-shifted as shown in FIG. 2. The condition for producing a self-excited chatter vibration will be satisfied and a standing vibration will be caused if the phase shift is at a given critical value, and therefore the self-excited chatter vibration can be suppressed by changing the phase shift of subsequent sinusoidal waves. Also, it has been found that the self-excited chatter vibration of a tool system has a frequency somewhat higher than the natural frequency of the tool system. The principle of this invention according to which the self-excited chatter vibration is suppressed, is that the natural frequency of the tool system is made to vary during its operation so as to change the pitch of sinusoidal wave on the surface of the workpiece.

According to this invention the continuous change of the natural frequency of a tool is performed as follows: In case where this invention is applied to a machine tool of the non-rotating type, a chatter suppressing inert mass is moved under transverse contact pressure along the portion of the non-rotating tool, which projects from the fixed to the tool mount. In case where this invention is applied to a machine tool of the rotating type, a bearing or bearings other than the bearing to support the spindle to which the rotating tool is fixed are used as a chatter suppressing contact and these separate bearings move along the tool spindle in the close contact relationship. Otherwise, a flywheel is used as a chatter suppressing contact and it is adapted to reciprocate on the tool spindle. In either way, the self-excited chatter vibration can be effectively suppressed. According to this invention the dynamic rigidity of the tool system can be easily controlled, and therefore, the dynamic rigidity of the tool system is so changed as to cause the self-excited chatter vibration to shift to the tool machine body system, where the self-excited chatter vibration is suppressed.

According to this invention, different chatter suppressing masses such as auxiliary tool holders, auxiliary bearings, flywheels are adapted to move on the tool at either side with regard to the null position at which the dynamic balance holds, and the self-excited chatter vibration in the workpiece can be easily suppressed by reciprocating the chatter, suppressing mass at either side with regard to the balancing position. The method and apparatus according to this invention can be equally applied to lathes, planers, shapers, drilling machines, milling machines, grinders, boring machines and other machine tools for the purpose of suppressing the self-excited chatter vibration.

Figure 3:
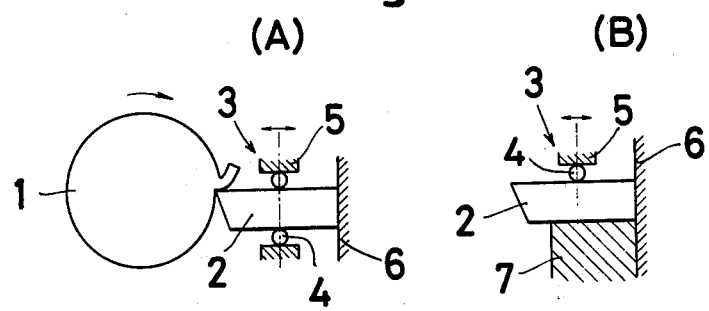
FIGS. 3(A) and 3(B) show the manner in which the principle of this invention is applied to a non-rotating tool of a machine tool.

Referring to FIGS. 3(A) and 3(B), there are shown the cases in which this invention is applied to a machine tool having a non-rotating tool, such as a lathe, planer, or shaper.

In FIG. 3(A), a first portion of a tool 2 is fixed to the main holder 6 of a tool mount, and a pair of chatter suppressing masses in the form of auxiliary holder units 3 each comprising a ball or roller 4 and associated supporter 5, are pushed against a freely projecting intermediate portion of the tool 2 in a transverse, direction. These auxiliary holder units are capable of reciprocating in the directions as indicated by arrows. The auxiliary holder is not required to be capable of supporting the tool, and it suffices that the holder unit be capable of keeping an associated ball or roller in close contact with the tool. The ball or roller, however, is continuously pushed against the tool at as high pressure as required, and it is made to reciprocate on the tool. In this connection the ball or roller is preferably made of a hard metal such as tool steel, high speed steel or sintered carbides to protect it from wear. The reciprocation of the auxiliary holder units can be performed by any conventional means which is proper for the purpose. Therefore, details of the reciprocating mechanism are not described herein.

Figure 4:
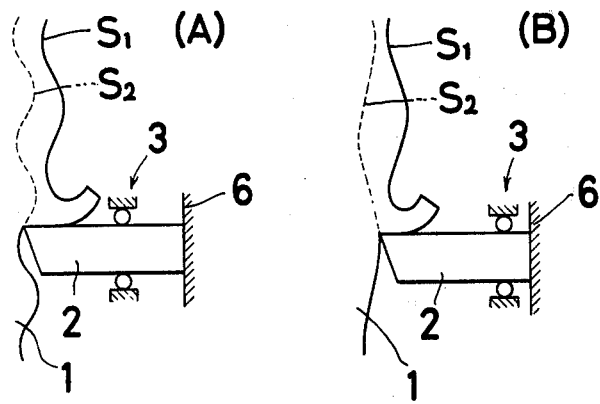
FIGS. 4(A) and 4(B) show the manner in which the tool machines the workpiece under the control of the apparatus according to this invention.

With the arrangement as mentioned above, the auxiliary holder is continuously reciprocated on a tool while a terminal portion of the tool is cutting or peeling a workpiece, thus causing the natural frequency of the tool to vary at all times. Therefore, unlike the situation shown in FIG. 1, there is no constant phase shift between successive sinusoidal waves. More specifically, as the auxiliary tool holder 3 approaches the tip of the tool 2, the rigidity of the tool system increases; whereas as the auxiliary tool holder 3 approaches the root of the tool 2, the rigidity of the tool system decreases. In this connection, referring to FIG. 4(A), the sinusoidal wave on the surface $S_2$ of the workpiece has a decreased pitch, compared with the pitch of the sinusoidal wave on the surface $S_1$ of the workpiece appearing as a result of the preceding working rotation of the workpiece at which the tool has machined the workpiece with the auxiliary holder being apart from the tip of the tool. Contrary to this, referring to FIG. 4(B), the sinusoidal wave on the surface $S_2$ of the workpiece has an increased pitch, compared with the pitch of the sinusoidal wave on the surface $S_1$ of the workpiece resulting from the preceding working rotation of the workpiece at which the tool has machined the workpiece with the auxiliary holder near the tip of the tool. As the auxiliary holder moves to-and-fro on the tool, the rigidity of the workpiece accordingly varies with the result that successive sinusoidal waves have a different phase from each other, thus finally suppressing the self-excited chatter vibration in the tool system. As is readily understood from the above, it is necessary that the auxiliary holder be put in continuous reciprocation on the tool so as to change the rigidity of the tool system.

The pressure at which the auxiliary holder is pushed against the tool, the distance over which the auxiliary holder moves to-and-fro on the tool, the speed at which the auxiliary holder moves on the tool, and other working factors may be determined properly for the purpose. Actual data on these factors are, for example, given as follows:

Size of tool shank : 19 x 19 mm$^2$
Overhang of the tool : 30 mm
Contact load : 30 to 80 kg
Amplitude of reciprocation : 5 to 10 mm If the rigidity of workpiece is by far stiffer in comparison with that of tool and self-excited chatter vibration is at a frequency close to the natural frequency of the tool system, the auxiliary holder is moved toward the tip of the tool until the vibration ceases, and the auxiliary holder is made to move back and forth to either side of the so-determined balancing position. In case where the self-excited chatter vibration occurs at a frequency in the vicinity of the natural frequency of the workpiece this indicates that the rigidity of the tool system is stiffer than that of the workpiece. In this case it is necessary that the rigidity of the tool system be lowered so as to match the dynamic rigidity of the workpiece by adjusting the contact position of the auxiliary holder on the tool or the contact load of the auxiliary holder against the tool. Contrary to the above case, if the rigidity of the tool system is smaller than that of the workpiece, the self-excited chatter vibration will be caused in the vicinity of the natural frequency of the tool system. In this case the auxiliary holder is put in contact with the tool at a position (dot-and-dash lines in FIGS. 3(A) and 3(B) in which the dynamic rigidity of the workpiece matches that of th tool system, and the auxiliary holder is made to move back and forth to either side of this balancing position, thus suppressing the self-excited chatter vibration.

In short, if the frequency of the self-excited vibration is equal to the natural frequency of the workpiece, the auxiliary holder is shifted and positioned toward the root of the tool (otherwise the tool is extended) until the vibration stops, and the auxiliary holder is made to reciprocate with the so-determined balancing point at the center. Contrary to this, if the frequency of the self-excited chatter vibration is close to the natural frequency of the tool system, the auxiliary holder is shifted toward the tip of the tool until the vibration stops, and the auxiliary holder is made to move back and forth to either side of the so-determined balancing point. Thus, in either case mentioned above, the self-excited chatter vibration will be effectively suppressed.

In case where the force required in cutting is at such an increased amount that the tool cannot be held by an associated main holder 6 alone, and where the tool is supported by an underlying base plate 7, a single auxiliary holder 5 is put on the uppersurface of the tool. The balancing position of the auxiliary holder is determined in the same manner as described above with reference to FIG. 3(A), and the ball or roller of the auxiliary holder is made to move back and forth to either side of the so-determined point, thus suppressing the self-excited chatter vibration.

Figure 5:
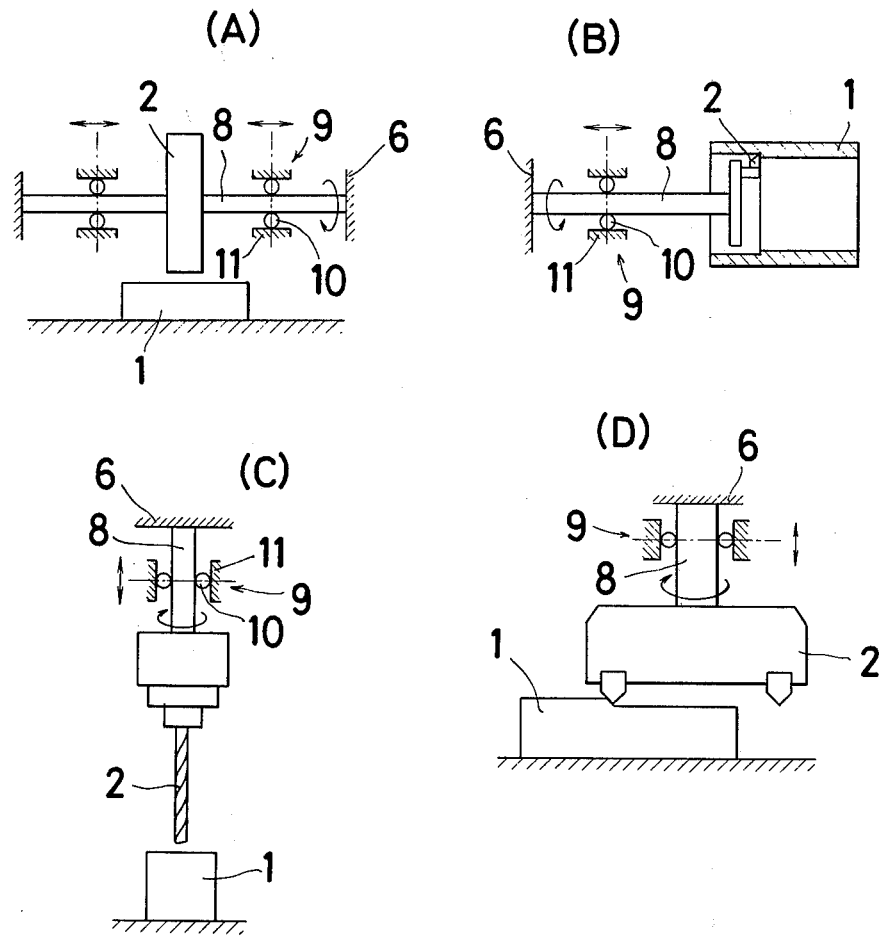
FIGS. 5(A) to 5(D) show the manner in which the principle of this invention is applied to a rotating tool of a machine tool.

Referring to FIGS. 5(A) to 5(D), there are shown some embodiments in which the principle of this invention is applied to machine tools having a rotating tool. In FIG. 5(A) there is shown a grinding machine having auxiliary holers provided thereto according to this invention. The grinding wheel 2 is fixed to an spindle 8, and the spindle is supported by bearings 6. The auxiliary holder 9 consists of revolving bodies (ball or rollers) 10 and associated retainers 11. On either side of the grinding wheel there is provided such an auxiliary holder in such a way that they reciprocate on the spindle of the grinding wheel in the longitudinal direction.

In FIG. 5(B) there is shown a boring machine having an auxiliary holder provided thereto according to this invention. The tool of boring bar 8 is supported by a bearing 6, and the auxiliary holder 9 is provided onto the boring bar so that it can reciprocate thereon.

In FIG. 5(C) there is shown a drilling machine having an auxiliary holder according to this invention. The tool of twist drill 2 is held by a chuck, and the rotating spindle 8 of the machine is supported by a bearing member 6. The auxiliary holder 9 is provided so as to reciprocate on the rotating spindle 8 of the machine.

FIG. 5(D) shows a milling machine having an auxiliary holder according to this invention. In rotating and milling, a force is recurrently applied to the tool, and this is the cause for the self-excited chatter vibration in the milling machine. The vibration can be easily suppressed by using an auxiliary holder 9 on the rotating spindle 8 of the machine in the same way as the above embodiments.

The embodiments of the rotating type as shown in FIGS. 5(A) to 5(D) are essentially the same as those of the non-rotating type as shown in FIGS. 3(A) and 3(B) except for the use of auxiliary bearing 9 in place of auxiliary retainer 3 and the self-excited chatter vibration can be equally suppressed according to the same principle.

The embodiments of FIGS. 5(A) to 5(D) have an auxiliary ball or roller bearing member 9 separate from the bearing member 6. The bearing member 6 may be modified so as to be capable of reciprocating on the spindle of the machine, thus doing without the auxiliary bearing member 9.

Figure 6:
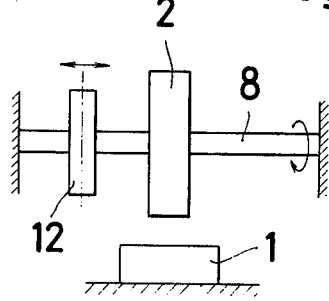
FIG. 6 shows still another embodiment in which this invention is applied to a machine tool having a rotating tool.

In FIG. 6, a machine of the rotating type uses a flywheel 12 which is capable of reciprocation on the spindle 8 of the tool 2 in place of the auxiliary holder or the auxiliary bearing, thus changing the natural frequency of the tool system. In this embodiment, as the flywheel 12 moves part from the tool, the natural frequency of the tool system accordingly increases. Otherwise, as the flywheel 12 approaches the tool, the natural frequency of the tool system accordingly decreases. This continuous change of the natural frequency is effective in suppressing the self-excited chatter vibration as much as in the above embodiments.

As is understood from the above, the principle of this invention according to which the self-excited vibration can be suppressed, is equally applicable to a machine tool of the non-rotating type or of the rotating type by providing an auxiliary holder to the non-rotating tool or by providing an auxiliary ball or roller bearing or a flywheel to the rotating tool, and the self-excited chatter vibration is suppressed by reciprocating the point of the chatter-suppressing mass with the tool or tool spindle, thus permitting high precision machining of the workpiece.

What is claimed is:

1. Method for suppressing self-excited chatter vibrations in a machine tool having a non-rotating tool comprising the steps of: putting an auxiliary holder comprising a revolving body and an associated retainer, on the tool at a given constant load, the tool being fixed to a tool mount by an associated main tool holder; shifting the auxiliary holder on the tool until the self-excited chatter vibration at the same frequency as the natural frequency of the tool system stops; and reciprocating the auxiliary holder on the tool to either side of the so-determined null point, thus continuously changing the natural frequency of the tool system.

2. Method for suppressing self-excited chatter vibrations at a frequency in the vicinity of the natural frequency of the workpiece in a machine tool having a non-rotating tool comprising the steps of: putting an auxiliary holder comprising a revolving body and an associated retainer, on the tool at a given constant load, the tool being fixed to a tool mount by an associated main tool holder; shifting the auxiliary holder on the tool until the vibration in the tool system is brought in dynamic balance with the vibration in the workpiece; and reciprocating the auxiliary holder on the tool to either side of the so-determined null point, thus continuously changing the natural frequency of the tool system.

3. In a method of machining a workpiece in which a tool has a first portion secured to a support, an intermediate portion freely projecting from said support in a predetermined direction, and a terminal portion connected to said first portion by said intermediate portion, said terminal portion engages a workpiece and removes material from said workpiece during relative movement of said tool and of said workpiece, whereby vibration may be induced in said tool, the improvement which comprises:
   a. holding an inert mass in contact with said intermediate portion under a force applied in a direction transverse to said predetermined direction; and
   b. continuously shifting the contact of said mass with said intermediate portion in said predetermined direction during said relative movement, said applied force being sufficient to impede said vibration.

4. In a method according to claim 3, said contact being reciprocated in said predetermined direction during said relative movement.

5. In a method as set forth in claim 4, said workpiece being moved relative to said terminal portion in said transverse direction during said relative movement.

6. In a method as set forth in claim 4, said terminal portion being moved relative to said workpiece transversely to said predetermined direction during said relative movement.

* * * * *